Nov. 6, 1962

D. B. MANS 3,062,225

MACHINE FOR IMMERSING WORK-PIECES IN CONTAINERS

Filed April 11, 1960

INVENTOR,
DERK BERNARD MANS

BY *Tarhof & Ascheroff*

ATTORNEYS

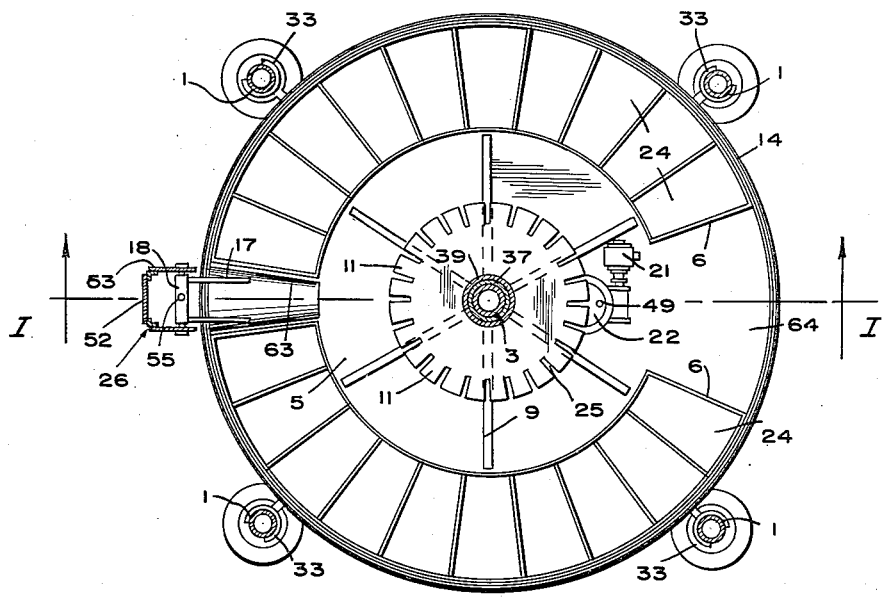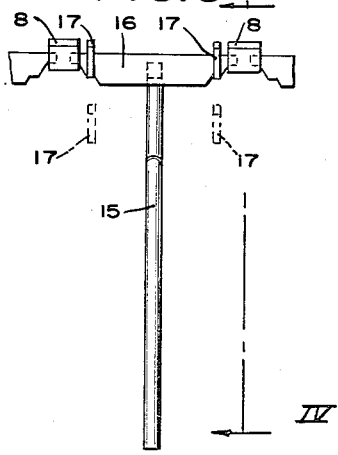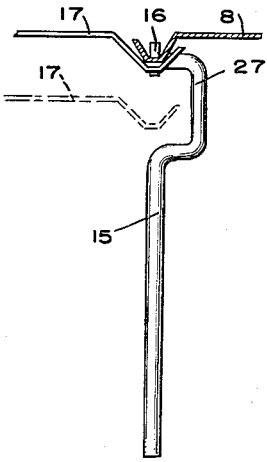

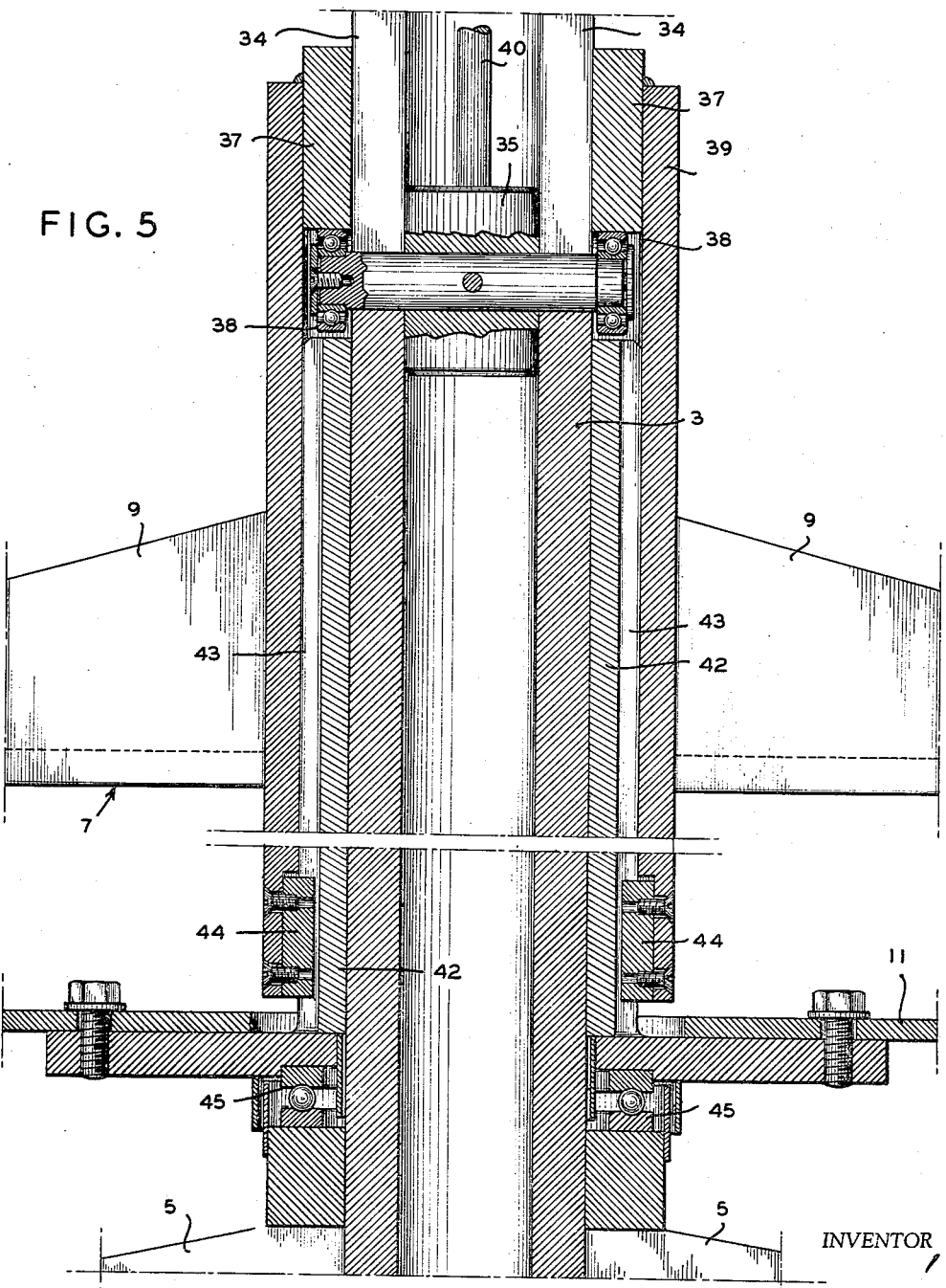

United States Patent Office  3,062,225
Patented Nov. 6, 1962

3,062,225
MACHINE FOR IMMERSING WORK-PIECES IN CONTAINERS
Derk Bernard Mans, Heelsum, Netherlands, assignor to Corode Electrochemie S.p.r.l., Brussels, Belgium, a Belgian firm
Filed Apr. 11, 1960, Ser. No. 21,188
9 Claims. (Cl. 134—69)

The present invention relates to a machine for immersing work-pieces into containers and more particularly comprises a machine for electroplating work-pieces, the machine being provided with a plurality of horizontally disposed small containers on one level and a large container disposed on a different level, the large container preferably being disposed immediately beneath the small containers.

According to one aspect of the present invention, there is provided a machine for immersing work-pieces into containers comprising at least one level of horizontally disposed small containers, at least one large container disposed on a different level, said levels being one above the other, and means for supporting said work-pieces and for sequentially immersing said work-pieces into said containers.

The means for supporting the work-pieces sequentially immerses the work-pieces into the small containers and horizontally moves the work-pieces in the large container. According to a construction, there is at least one level of small containers, the containers being disposed in a more or less annular formation. The large container is preferably positioned beneath the small containers, the large container having a generally circular shape.

Each work-piece, according to the preferred construction, is successively immersed into each of the small containers. Then each work-piece will be moved to the level of the large container and the work-pieces move horizontally through the large container. The work-pieces may then be transferred to the level of the small containers for further immersion in other of the small containers.

The present invention, therefore, includes first means for supporting said work-pieces and for sequentially moving them horizontally from a position above one small container to a position above the next small container and for vertically moving the work-pieces so that the work-pieces are sequentially immersed in the small containers.

Second means are provided for supporting the work-pieces and for moving them horizontally in the large container and lifting means are provided for transferring the work-pieces between the first and second means, that is, for transferring them from the first means to the second means and/or vice versa.

Because of the annular shape of the container formations, the first and second means comprise a disk-like member rotatably mounted about a central shaft with the first means also being mounted about said shaft for axial movement relative thereto. In order to rotate the disk-like members there is provided indexing means which alternately rotates each of the disk-like members in a stepwise manner.

By positioning the containers one above the other, the machine only occupies a relatively small floor area and the machine is not particularly high for, as will be readily apparent hereinafter, it is not necessary to leave a vacant space over the large underlying container for up and down movement of the work-pieces since the work-pieces in the large container are moved in a horizontal direction only. In the event that the small containers and the large container were positioned on one level, the machine would occupy considerably more floor space and this would be highly undesirable.

A specific embodiment of the invention will now be described by way of example with reference to the accompanying drawings in which:

FIG. 2 is a horizontal section taken along the line 2—2 of FIG. 1.

FIG. 3 is an enlarged fragmentary detail of the book transfer mechanism used in the machine of FIG. 1.

FIG. 4 is a vertical section taken on the line 4—4 of FIG. 3.

FIG. 5 is an enlarged fragmentary detail in vertical section of a portion of the central shaft of the device of FIG. 1.

Figure 1:
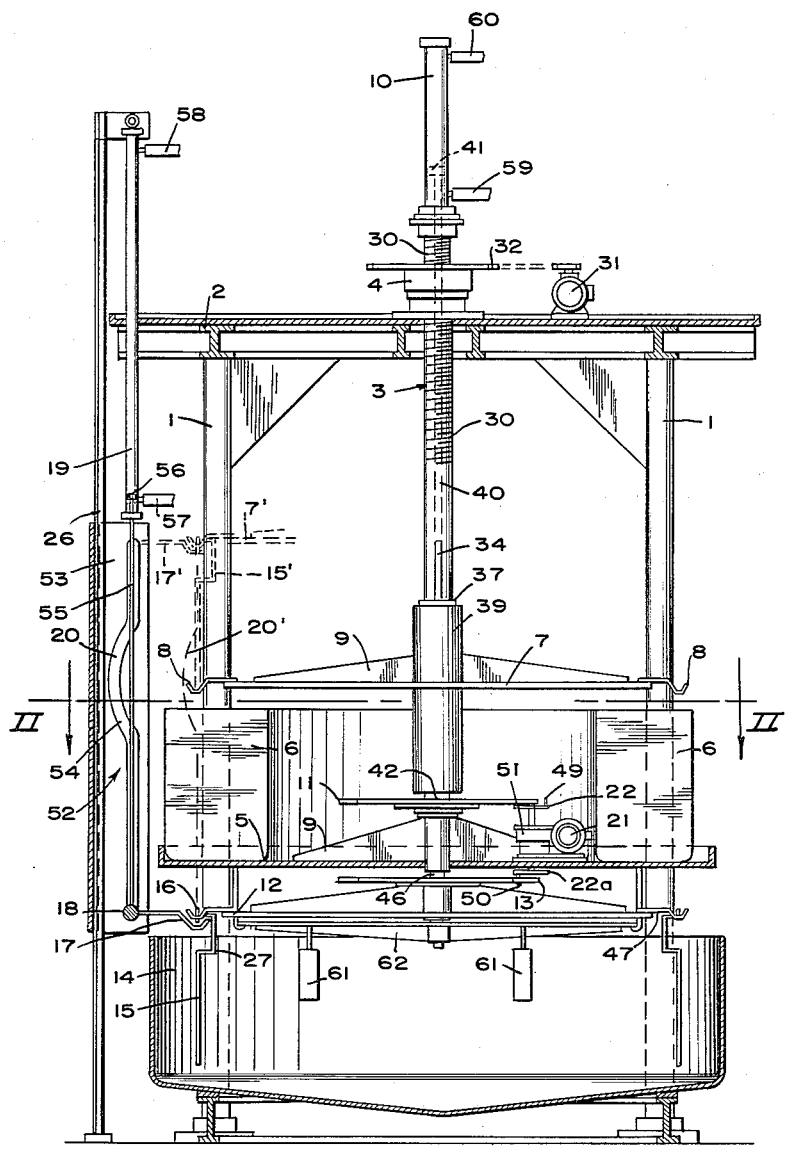
FIG. 1 shows a vertical section of the device taken generally along the line 1—1 of FIG. 2 with some of the parts shown in elevation and others in section.

The device shown in FIGS. 1 and 2 comprises four supporting columns 1, the columns supporting a platform 2. Suspending from the platform is a hollow central shaft or spindle 3 externally threaded as shown at 30. An internally threaded nut 4 is mounted about the upper end of the shaft in threaded engagement with the threads 30 so that when nut 4 is rotated by means of the motor 31 and belt 32, the shaft 3 can be raised or lowered.

Suspended from the threaded shaft 3 is a plate 5. Plate 5 is provided with outwardly extending forks 33 (see FIG. 2) which engage the columns 1 to prevent rotation of plate 5. Positioned on plate 5 are two segment-shaped containers 6. These containers 6 are each divided by partitions into a plurality of compartments 24, each container 6 being by example divided into ten compartments. These compartments 24 constitute small containers and these small containers are disposed on plate 5 in what may be considered an annular formation although they do not comprise a complete annulus.

Mounted above the small containers is a hooked disk-like member 7 having a plurality of hooks 8, twenty-four in number, by way of example, distributed about the circumference of the disk 7. Disk 7 is mounted about the spindle or shaft 3 for rotation as well as for axial movement.

Referring particularly to FIG. 5, shaft 3 is provided with opposed longitudinal slots 34. Positioned within hollow shaft 3 is a bushing 35. A pin 36 passes through the slots 34 and through the bushing 35. A sleeve 37 is rotatably mounted around shaft 3, the lower rim of the sleeve resting upon bearing 38 at either end of the pin 36. A second sleeve 39 is mounted around shaft 3, the upper end of said sleeve 39 being secured to, as by welding, sleeve 37. Disk 7 is mounted around sleeve 39 and secured thereto.

It is, therefore, apparent that when bushing 35 is raised, the pin 36 will also be raised to lift sleeve 37, sleeve 39 and disk 7. Bushing 35 can be moved vertically by means of a rod 40 which rod 40 extends upwardly through the hollow shaft 3 terminating in a piston 41 (see FIG. 1), in an air cylinder 10 mounted at the top of shaft 3. Sleeve 37 and therefore sleeve 39 and disk 7 are free to rotate about shaft 3 regardless of the axial position of the bushing 35 relative to the shaft 3.

Disk 7 is rotated by an indexing mechanism such as a Geneva indexing mechanism which is constituted by a disk 11 having a plurality of radial slots 25 therein, said slots being twenty-four in number to correspond with the twenty-four hooks 8. The disk 11 is secured to the lower end of a sleeve 42 which is rotatably mounted about and coaxial with shaft 3, the sleeve 42 being provided with longitudinal grooves 43 on the outer side thereof.

Keys 44 are secured to the inner side of the lower end of sleeve 39, the keys 44 being slidably mounted in the grooves 43. Since the keys 44 prevent relative rotation of sleeve 42 and sleeve 39, while permitting telescopic movement between said sleeves, rotation of disk 11 will cause rotation of disk 7, whether disk 7 be in the upper or lower position. The disk 11 is supported at its underside for rotation about shaft 3 by means of bearings 45 positioned between the undersurface of disk 11 and the upper surface of plate 5 which is fixedly secured to shaft 3.

At a level below plate 5 there is positioned at least one large container 14, said container being preferably circular when one container is used.

Mounted above container 14 is another hooked disk-like member 12 similar to disk-like member 7. Disks 7 and 12 are reinforced by triangular bracing 9. Although in the illustrated embodiment, disk-like members 7 and 12 are disks, it is apparent that members 7 and 12 may have other equivalent formations which will permit circumferential mounting of hooks or other means for suspending work holders. By way of example, members 7 and 12 may comprise a plurality of radiating spokes or arms (not shown) in a wheel-like formation having hooks at the ends of the spokes or arms. The word "disk-like" or "disk-shaped" therefore as used herein includes disks, radiating arms and similar constructions.

The second disk 12 is rotatably suspended about a bolt 46 secured to the lower end of shaft 3. This disk has a plurality of hooks 47 spaced around the circumference thereof, the hooks being equal in number to the hooks 8. Disk 13 is mounted coaxially with disk 12 for rotation about bolt 46 so that when disk 13 is rotated, disk 12 will also rotate. Disk 13 is part of the indexing mechanism for stepwise rotating disk 12 and disk 13 has the same slotted structure as disk 11. Disks 12 and 13, although rotatable relative to the shaft 3, are not movable axially relative thereto.

The two slotted disks 11 and 13 are driven respectively by crank members 22 and 22a which are mounted on a single shaft 48 with the pin 49 of crank member 22 being 180° displaced from the pin 50 on crank member 22a. The shaft 48 is driven by an electric motor 21 through a reducing gear arrangement 51. The reducing gear arrangement includes a cam (not illustrated) which acts in such a manner that every time the current is switched on, the shaft 48 rotates through an angle of 180° and then stops.

Rotation of shaft 48 together with the crank members 22 and 22a causes stepwise rotation of the slotted disks 11 and 13 which cause the equivalent rotation of hooked disks 7 and 12. It is readily apparent that every time the current is switched on, one of the slotted disks 11 or 13 rotates through $\frac{1}{24}$ of a revolution.

On the left side of FIGS. 1 and 2 there is illustrated the lifting mechanism 26 which transfers work holders 15 from hooked disk 12 to hooked disk 7 and vice versa. The lifting mechanism comprises a channel member 52 having opposed walls 53, said opposed walls having therein longitudinal guide channels 20, said channels being generally vertical with an outward bend 54 on the level with hooked disk 7 when the latter is in the lowermost position. The work-pieces to be treated are suspended from work holders or bars 15 which are fixed in transverse bridge members 16. The lateral ends of bridge members 16 can be supported by a pair of hooks 8 on disk 7 or a pair of hooks 47 on disk 12 or a pair of hooks 17 on the lifting mechanism.

The lifting mechanism comprises a horizontal guide piece 18 having the ends thereof fitted in guide channels 20 so that guide piece 18 is slidably mounted in the lifting mechanism 26. A vertical rod 55 is secured to guide piece 18, the upper end of the rod 55 being secured to a piston 56 in an air cyclinder 19 mounted at the upper end of the lifting mechanism. Therefore, when compressed air is introduced through port 57 at the lower end of air cylinder 19, the piston 56 will be urged upwardly and when air is introduced in port 58 at the upper end of air cylinder 19, the piston 56 will be urged downwardly so that up and down movement of piston 56 will cause corresponding up and down movement of guide piece 18.

A hook 17 is mounted at each end of guide piece 18. Hooks 17 are spaced closer together than are adjacent pairs of hooks 8 or 47.

The operation of the device will now be described. In the position shown in FIGS. 1 and 2, the lower hooked disk 12 is being rotated as can be seen from the position of the crank 22a. During this rotation the work holder 15 at the left side of FIG. 1 can rotate past the hook 17 because the work holder 15 is provided with an inwardly directed bend 27. This can be more clearly seen in FIG. 4 wherein the hook 17 in the lowest position is shown in dotted lines. When disk 12 completes its rotation through $\frac{1}{24}$ of a revolution, air is introduced through lower port 57 of air cylinder 19 which causes guide piece 18 to move upward. During this upward movement hooks 17 engage bridge member 16. This engagement is clearly shown in FIGS. 3 and 4 wherein hooks 17 are shown in solid lines.

Further upward movement of guide piece 18, therefore, raises work holder 15 to the position shown by the dotted lines 15' at the left of FIG. 1. During the upward passage, because of the bend 54 in the guide channels 20, the hooks 17 which carry work holder 15 can safely pass the hooks 8 on disk 7 the path of the hooks being indicated by dotted line 20'. As soon as the hooks 17 reach their uppermost position as shown by dotted line 17', air is introduced through port 59 at the bottom end of air cylinder 10 to urge the piston 41 upwardly thereby raising hooked disk 7 to the position shown in dotted lines 7' in FIG. 1.

A pair of hooks 8 in alignment with the lifting mechanism are empty and during the upward movement of disk 7, this pair of hooks 8 engage the extremities of bridge member 16 to thereby transfer the work holder from the lifting mechanism to hooks on disk 7.

After the disk 7 has reached its uppermost position, motor 21 is actuated to cause rotation of disk 7 through $\frac{1}{24}$ of a revolution. During this revolution, the work holder 15 which was just removed from the lifting mechanism, can safely pass hooks 17 of the lifting mechanism because of the bend 27 in the work holder. As soon as disk 7 completes its partial rotation, port 60 at the upper end of cylinder 10 is actuated so that piston 41 and, therefore, disk 7 is urged downwardly.

During the downward movement, the next work holder 15, supported on hooks 8 of disk 7, is engaged by the hooks 17 of the lifting mechanism. The hooked disk 7 continues its downward movement until it reaches the lowermost position which is shown in FIG. 1 whereupon air is admitted in upper port 58 of air cylinder 19 to urge the lifting mechanism downward. As hooks 17, now carrying the next work holder 15, move downwardly the will again pass the hooks 8 on disk 7 because of the bend 54 in the guide channels.

The hooks 17 continue their downward movement until they pass the empty pair of hooks 47 on lower disk 12 to thereby transfer the work holder to the hooks 47. Hooks 17 continue their downward movement until they have become detached from the work holder which is now supported on disk 12 and then the motor 21 is again turned on to rotate disk 12 $\frac{1}{24}$ of a revolution and the cycle is repeated. It is apparent that the work holders, when they are suspended from disk 12, move horizontally through the large container 14. It is also apparent that since the upper disk 7 moves sequentially upwardly, horizontally, downwardly, upwardly, horizontally, downwardly, etc., the work holders which are secured to the upper disk 7 are successively immersed in each of the small containers.

When this apparatus is used for electroplating, anodes 61 may be suspended from plate 62 which is fixed to the lower end of spindle 3 by means of bolt 46. When it is necessary to clean the apparatus, change the anodes or otherwise have access to container 14, rotation of nut 4 will cause the elevation of the spindle 3 together with the various plates and disks secured thereto.

In the illustrated embodiment, the operator stands on the righthand side of the device wherein there is provided a space 64 between the segment-shaped upper containers 6, the space being approximately three "stations" in size whereby the operator can remove the completed work from work holder 15 and attach new work to the work holders. The new work then sequentially transverses the ten compartments 24 in one container 6 after which the work is conveyed to a lowermost container 14. When in container 14, the work is horizontally conveyed therethrough in 24 cycles after which the work is then carried upward by the lifting mechanism and carried through the compartments of the other container 6, finally ending up at the loading station. The plate 5 is provided with an opening 63 at the lifting station so that the lifting mechanism can move between the upper and lower positions. It is readily apparent that the cycles of operations including the cycle of compressed air for actuating the pistons in cylinders 10 and 19 as well as the indexing mechanism can be made completely automatic using any conventional automatic control.

In the illustrated embodiment there has been shown only two levels of containers with the containers being positioned on each level in a generally annular formation. The concept of the present invention includes more than two levels and is not limited to the particular number of small containers shown or the use of a single circular large container.

Although only one lifting mechanism has been illustrated, it is apparent that the invention comprehends the use of a plurality of lifting mechanisms (not shown) in the event the cycle of operations is to be varied. It is also apparent that, although the main shaft 3 is positioned above the containers, the shaft with the accompanying sleeves may be positioned below the containers.

The apparatus illustrated is preferably used in connection with electroplating. The plating takes place in the large container in which a plurality of anodes 61 are suspended. For example, the apparatus may be used, by way of example, for zinc, silver, nickle or chromium plating. The contents of the small containers as well as the large container will vary according to the particular process of electroplating.

The work-pieces to be electroplated are secured to the work holders 15 as by clips or in any other conventional manner. Before the actual electroplating operation, the work-pieces are sequentially immersed in some of the small containers to clean and otherwise prepare the work for electroplating.

The work is then transferred to the large container 14 where it is electroplated and then passed through other of the small containers to remove the electroplating solution and otherwise complete the process. The solutions used in the small containers and the large container are conventional and do not form part of the present invention.

I claim:

1. A machine for immersing work-pieces into containers comprising at least one level of horizontally disposed small containers, at least one large container disposed on a different level, said levels being one above the other, the containers of each of said levels being disposed in a generally annular formation, first conveyor means for supporting said work-pieces and for sequentially moving them horizontally from a position above one small container to a position above the next small container and for vertically moving said work-pieces to sequentially immerse said work-pieces into said small containers, second conveyor means for supporting said work-pieces and for moving them horizontally in said large container, and at least one lifting means separate from said conveyor means for transferring said work-pieces from said first to second conveyor means along a predetermined path and for transferring said work-pieces from said second to said first conveyor means along the same path but in the opposite direction.

2. A machine as recited in claim 1 including indexing means for moving said first and second means in a stepwise manner.

3. A machine for immersing work-pieces into containers comprising at least one level of horizontally disposed small containers, at least one large container disposed on a different level, said levels being one above the other, the containers of each level being disposed in an annular formation about a central shaft, first conveyor means for supporting said work pieces and for sequently moving them horizontally from a position above one small container to a position above the next small container and for vertically moving said work pieces to sequently immerse the work-pieces into said small containers, said first conveyor means comprising a disk-shaped member mounted about said shaft for rotation thereabout and for axial movement thereon, second conveyor means for supporting said work-pieces and for moving them horizontally in said large container, said second conveyor means comprising a disk-shaped member mounted for rotation about said central shaft, said disk-shaped members having circumferentially spaced means thereon for removably supporting work holders for supporting said work pieces, indexing means for moving said first and second conveyor means in stepwise manner, and at least one lifting means separate from said conveyor means for transferring said work pieces between said first and second conveyor means.

4. A machine for immersing work-pieces into containers comprising at least one level of horizontally disposed small containers, at least one large container disposed on a different level, said levels being one above the other, first conveyor means for supporting said work-pieces and for sequentially moving them horizontally from a position above one small container to a position above the next small container, and for vertically moving said work-pieces to sequentially immerse said work-pieces into said small containers, second conveyor means for supporting said work-pieces and for moving them horizontally in said large container, the containers of each level being disposed in an annular formation about a central shaft, said first conveyor means comprising a disk-shaped member mounted about said shaft for rotation thereabout and for axial movement thereon, said second conveyor means comprising a disk-shaped member mounted for rotation about said central shaft, said disk-shaped members having circumferentially spaced means thereon for removably supporting work holders for supporting said work-pieces, indexing means for moving said first and second conveyor means in a stepwise manner, said indexing means alternately rotating each of said disk-shaped members, and at least one lifting means for transferring said work-pieces between said first and second conveyor means, said lifting means transferring said work-pieces while said disk-shaped members are not rotating.

5. A machine for immersing work-pieces into containers comprising at least one level of small containers horizontally disposed in an annular formation, at least one large container having an annular formation disposed on a different level, a central shaft, a first disk-shaped member mounted about said shaft above said level of small containers, said first disk-shaped member being mounted for rotation about said shaft and for axial movement thereon, means for axially moving said first disk-shaped member on said shaft, a second disk-shaped member rotatably mounted about said shaft above the level of said large container, both of said disk-shaped members having circumferentially spaced means thereon for removably supporting work holders for supporting said work-pieces, indexing means for automatically rotating each of said disk-shaped members in a stepwise manner, and at least one lifting means for transferring said work holders between said disk-shaped members.

6. A machine as recited in claim 5 wherein said indexing means comprises a first slotted disk for rotating said first disk-shaped member and a second slotted disk for rotating said second disk-shaped member, and a pair of crank members, 180° apart, for rotating said slotted disks, said crank members being mounted on a single shaft.

7. A machine as recited in claim 6 wherein said means for removably supporting the work holders comprises hooks circumferentially spaced around the periphery of each disk-shaped member and said lifting mechanism includes hooks for transferring the work holders between the hooks of the disk-shaped members.

8. A machine as recited in claim 7 wherein the hooks of the lifting mechanism are mounted on a guide piece, means are provided for raising and lowering the guide piece through a predetermined path.

9. A machine for immersing work-pieces into containers comprising a supporting framework, a vertical shaft in said framework, a plurality of small containers, means supporting said containers in an annular horizontal formation about said shaft, a first disk mounted about said shaft above said small containers, said first disk being mounted for rotation about said shaft and for axial movement thereon, means for axially moving said first disk, at least one large container positioned beneath said small containers, a second disk rotatably mounted about said shaft above said large container but below said small containers, each of said disks having a plurality of circumferentially spaced hooks thereon for removably supporting work holders for supporting said work pieces, indexing means for alternately rotating each of said disks in a stepwise manner, at least one lifting means for transferring said work holders between said disks, said lifting means comprising a guide means having a generally vertical guide channel therein, a guide piece slidably mounted in said channel between a lower position adjacent said second disk and an upper position adjacent an upper position of said first disk, means for raising and lowering said guide piece, and hook means on said guide piece for engaging a work holder, upon relative vertical movement between said hook means and work holder, said lifting means being so positioned that the hook means on said guide piece will be positioned between the hooks of said second disk when said guide piece is adjacent its lower position and between the hooks of said first disk when the latter is in an upper position, said guide channel having an outward bend therein so that, as said guide piece is moved between the lower position and the upper position, the hook means on said guide piece will not pass between the hooks of said first disk when the latter is adjacent its lower position.

References Cited in the file of this patent

UNITED STATES PATENTS

| | | |
|---|---|---|
| 723,881 | Koehler | Mar. 31, 1903 |
| 1,991,118 | Raiche | Feb. 12, 1935 |
| 2,583,379 | Kling | Jan. 22, 1952 |
| 2,741,221 | Weiskopf | Apr. 10, 1956 |